A. E. LATTIMORE.
GUIDE AND POSITION GRIP FOR SLIDING VEHICLE WINDOWS.
APPLICATION FILED MAY 26, 1920.
1,384,904. Patented July 19, 1921.
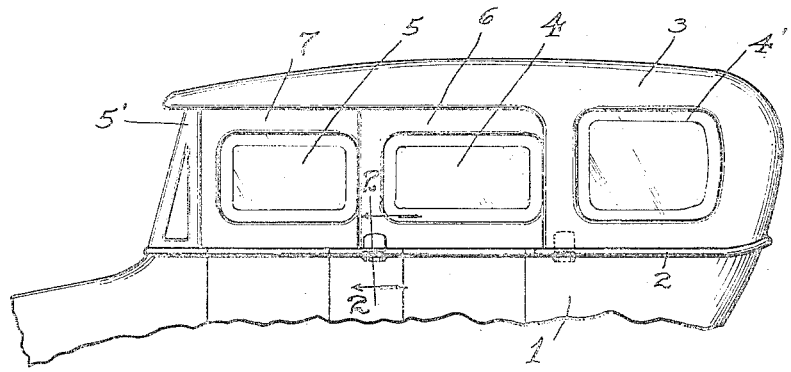
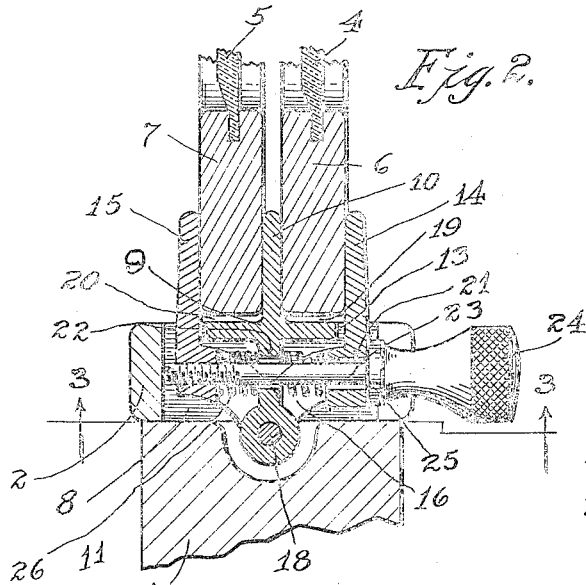
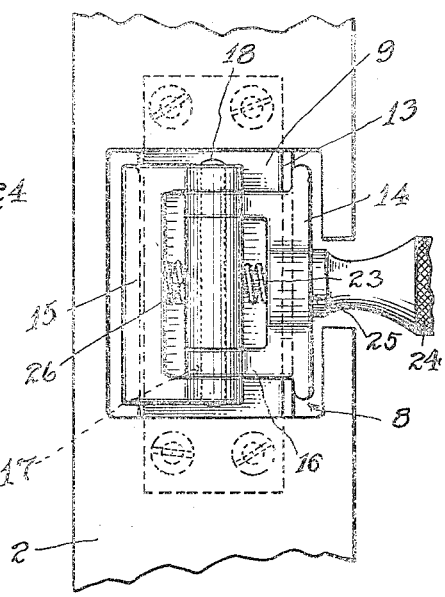
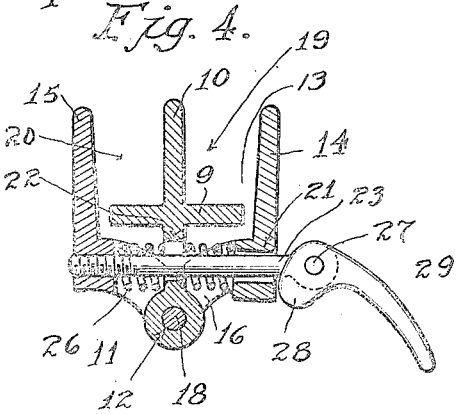
INVENTOR.
A. E. Lattimore
BY
Acker & Totten
ATTORNEYS.

UNITED STATES PATENT OFFICE.

ALBERT E. LATTIMORE, OF SAN FRANCISCO, CALIFORNIA.

GUIDE AND POSITION-GRIP FOR SLIDING VEHICLE-WINDOWS.

1,384,904.    Specification of Letters Patent.    Patented July 19, 1921.

Application filed May 26, 1920. Serial No. 384,369.

*To all whom it may concern:*

Be it known that I, ALBERT E. LATTIMORE, citizen of the United States, residing at San Francisco, in the county of San Francisco and State of California, have invented certain new and useful Improvements in Guides and Position-Grips for Sliding Vehicle-Windows, of which the following is a specification.

The present invention relates to a device designed particularly for use in connection with permanent vehicle tops having sliding windows, and by the employment of which a guide is provided for the windows, and means is afforded for reducing the transverse area of the guide whereby the windows are capable of being locked in their adjusted position and are prevented from rattling.

One of the principal objects of the present invention is to provide a simple construction adapted for mounting on the vehicle body rail whereby the vehicle occupants may readily lock the windows in any desired adjusted position; to provide a construction by the employment of which vehicle windows may be held in any desired position, and are not required to be moved any particular distance before being locked.

A further object is to provide a construction which is capable of being cheaply manufactured and installed; one which does not detract from the appearance of the vehicle; and one which is capable of being easily and quickly operated.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit of the invention or sacrificing any of the advantages thereof.

To more fully comprehend the invention, reference is directed to the accompanying drawings wherein:—

Figure 1 is a view in side elevation of a portion of a vehicle body equipped with a permanent top and disclosing the preferred embodiment of my invention in use in connection therewith.

Fig. 2 is a vertical sectional view taken on line 2...2 of Fig. 1.

Fig. 3 is a bottom plan view taken on line 3...3 of Fig. 2.

Fig. 4 is a vertical central sectional view of a modified form of construction.

In the drawing, 1 indicates a vehicle body, the rear portion of the top side rail 2 of which supports the rear of what may be termed a permanent vehicle top 3 having side windows 4' at opposite sides of the tonneau seat, and the front end of said top is preferably supported by the wind shield structure 5'. To provide a closure for the forward open sides of the top 3, I provide suitable sliding windows 4 and 5, said window 4 being carried by a frame 6 and the window 5 being carried by a frame 7, said frames being mounted at their upper edges to slide on any suitable guides not shown. The above described construction may be of any conventional form well known to the motor vehicle top manufacturers, and for this reason the detailed construction has not been illustrated.

The frames 6 and 7 slide longitudinally of the body rail 2, and at points on said body rail 2, preferably in line with the front seat back and immediately in rear of the tonneau door, pass through suitable guides constructed in the following manner. Seated flush with the top of the body rail 2 and secured in position thereon above a recess 8 is a supporting plate 9 preferably rectangular in plan, and upwardly from the center of which extends the division member 10 disposed longitudinally of the rail 2.

Downwardly from the under side of the plate 9 in line with the member 10 is an arm 11 extending into the recess 8, the arm at its lower end being provided with a pintle receiving opening 12, Fig. 2 of the drawings. Positioned one at either side of the side edges 13 of the plate 9 are frame guide plates 14 and 15 disposed parallel with the division member 10, and from their lower edges extend the inwardly curved arms 16 provided with pintle openings 17 which are adapted to lie in alinement with the opening 12, when the arms are positioned in overlapping relation, as in Fig. 3 of the drawings.

To provide a fulcrum on which said plates 14 and 15 are adapted to swing to and from the member 10, there is inserted in the openings 17 and 12 a pintle 18 of any suitable form. This pintle providing a well known hinge joint for the members 14 and 15 relatively to the plate 9 and providing a fulcrum whereby said members 14 and 15 are capable of swinging movement to and from the member 10 to increase or decrease the transverse width of the frame guides 19 and 20 formed between members 10, 14 and 15, one on each side of the member division 10, as in Fig. 2 of the drawings.

The members 14 and 15 at their bases are each provided with a transverse opening 21 arranged in alinement, and in alinement with an opening 22 in the arm 11 of the member 12, the opening 21 of the member 15 having a threaded interior wall surface. An adjusting member 23 is insertible through the opening 21 in the member 14 and the opening 22 in the member 11, it having threaded engagement with the wall of the opening of the member 15 and capable of axial rotation in said respective openings. The member 23 which is preferably cylindrical in cross section is provided with an operating head 24 and between the member 23 and head 24 is provided a shoulder 25 which contacts with the outer surface member 14 surrounding its opening 21, thus on the roation of the member 23 through the head 24, the members 14 and 15 are adjusted to and from the member 10 increasing or decreasing the transverse width of the frame guides 19 and 20. To automatically separate the members 14 and 15 on the unthreading of the member 23 to increase the transverse width of the guides 19 and 20 to permit sliding of the frames 7 and 6 therein, I prefer to employ coiled springs 26 positioned one at each side of the arm 11 surrounding the member 23, and each co-acting at its outer end with the inner face of the lower portion of the respective members 14 and 15.

In the modified construction illustrated in Fig. 4, the arrangement of parts is similar to that illustrated in Figs. 2 and 3, but in order to provide a quick acting member for operating the members 14 and 15, I dispense with the head or thumb piece 24 and pivot to the end of the member 23 as at 27 a cam 28 adapted to contact with the outer surface of the lower portion of the member 14, the operation of the cam being facilitated by the movement of a lever 29 secured thereto.

From the above description it will be apparent that the frames 6 and 7 are slidable in permanent guides and are adapted to be held in any desired position within the guides by the operation of the members of the device whereby the area of the guides in one direction is reduced.

It will be apparent that the unscrewing of the member 23 permits the springs 26 to separate the members 14 and 15, which operation permits the ready sliding of the frames 6 and 7 within their respective guides 19 or 20. By providing the guides at a point adjacent the side of the front seat back, and also at a point immediately in rear of the tonneau door, both the frame for supporting the windows of the driver's compartment and of the tonneau are capable of being held in their adjusted position and prevented from rattling by the installation of but two units of the apparatus described.

I claim:—

1. A guide and position stop for sliding vehicle windows, comprising a pair of spaced guide walls movable one relatively to the other, a fixed dividing wall disposed between said guide walls for dividing the space therebetween into a pair of guide channels open at their top and opposite ends and through each of which is adapted to slide the lower edge of a vehicle window frame, means for mounting the dividing wall in position on a vehicle, a fulcrum connecting the lower ends of said guide walls beneath said dividing wall, a shouldered adjusting screw threaded into one of said guide walls with the shoulder contacting with the other and adapted for rotation to vary the transverse area of said channels to clamp the windows in their adjusted position therein and spring means surrounding said adjusting screw and contacting with the arms to separate the same on the release of the screw.

2. A guide and position stop for sliding vehicle windows, comprising a supporting plate for securing to the vehicle body, a member extending upwardly from the upper surface thereof and providing a dividing wall, an arm depending from said plate, a guide wall positioned opposite each side edge of said plate and providing with said dividing wall a pair of guide channels, one located at each side of said dividing wall, said guide walls at their lower edge being yoked and fulcrumed to said arm to permit the upper portion thereof to swing to and from said dividing wall, and means for moving said side walls to and from said dividing wall to vary the transverse area of said guide channels.

3. A guide and position stop for sliding vehicle windows, comprising a supporting plate, a dividing wall integral with the plate and extending upwardly from the upper surface thereof, an arm extending centrally from the under surface of said plate, a pair of guide walls disposed parallel with the sides of said plate one positioned at each side of said dividing wall, said guide walls formed at a point between said plate with inwardly extended furcations, a fulcrum connection between said furcations and said arms to permit said arms to swing to and from the side edges of said supporting plate, manually controlled means for drawing said side walls together, and means for separating said side walls on the release of said manually controlled means.

4. A guide and position stop for sliding vehicle windows, the same comprising a supporting plate disposed in a horizontal plane, a dividing wall extending upwardly from the center thereof, a pair of side wall members disposed one at each side of said supporting plate and forming with said dividing wall and said supporting plate a pair of open topped open ended guides, said side walls mounted to fulcrum to and from the side edge of said plate to vary the transverse area of the guides formed thereby, said wall members at a point below said plate being provided with alined openings, a member extending through said openings and capable of adjustment for moving said wall members toward said dividing wall and a spring surrounding said member and adapted on the release of same for separating said side wall members.

In testimony whereof I have signed my name to this specification.

ALBERT E. LATTIMORE.